(12) United States Patent
Kawaguchi et al.

(10) Patent No.: US 9,004,220 B2
(45) Date of Patent: Apr. 14, 2015

(54) VEHICLE HAVING COMPACT CONFIGURATION

(71) Applicant: Honda Motor Co., Ltd., Tokyo (JP)

(72) Inventors: Atsushi Kawaguchi, Wako (JP); Masayuki Fujita, Wako (JP); Yohei Kawasaki, Wako (JP); Futoshi Miyakawa, Wako (JP); Tatsuya Shiokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/851,151

(22) Filed: Mar. 27, 2013

(65) Prior Publication Data

US 2013/0277137 A1  Oct. 24, 2013

(30) Foreign Application Priority Data

Mar. 30, 2012 (JP) ................. 2012-079723

(51) Int. Cl.
| | | |
|---|---|---|
| B62D 21/00 | (2006.01) | |
| B62D 63/04 | (2006.01) | |
| B60G 3/20 | (2006.01) | |
| B60K 1/00 | (2006.01) | |
| B62D 3/12 | (2006.01) | |
| B62D 5/04 | (2006.01) | |

(52) U.S. Cl.
CPC ........ *B62D 63/04* (2013.01); *B60G 3/20* (2013.01); *B60K 1/00* (2013.01); *B62D 3/12* (2013.01); *B62D 5/04* (2013.01); *B60G 2300/13* (2013.01)

(58) Field of Classification Search
USPC ............... 180/443, 444; 280/93.512, 93.514, 280/124.154, 124.1
See application file for complete search history.

(56) References Cited

U.S. PATENT DOCUMENTS

| | | | | |
|---|---|---|---|---|
| 5,078,223 | A | * | 1/1992 | Ishiwatari et al. ............ 180/68.1 |
| 5,327,989 | A | * | 7/1994 | Furuhashi et al. ............ 180/248 |
| 6,089,582 | A | * | 7/2000 | Hasshi ..................... 280/93.512 |
| 6,336,514 | B1 | * | 1/2002 | Ramacher et al. .............. 180/21 |
| 7,938,481 | B2 | * | 5/2011 | Kobayashi et al. ........... 296/204 |
| 8,047,557 | B2 | * | 11/2011 | Kobayashi et al. .... 280/124.135 |
| 8,408,569 | B2 | * | 4/2013 | Keil et al. ............... 280/124.154 |
| 2004/0129489 | A1 | * | 7/2004 | Brasseal et al. ............... 180/350 |
| 2007/0257479 | A1 | * | 11/2007 | Davis et al. ................... 280/783 |
| 2012/0193163 | A1 | * | 8/2012 | Wimpfheimer et al. ...... 180/233 |
| 2013/0175779 | A1 | * | 7/2013 | Kvien et al. ............. 280/124.15 |

FOREIGN PATENT DOCUMENTS

JP    2007-069864    3/2007

\* cited by examiner

*Primary Examiner* — Kevin Hurley
*Assistant Examiner* — Michael Stabley
(74) *Attorney, Agent, or Firm* — Squire Patton Boggs (US) LLP

(57) ABSTRACT

A strut suspension is disposed on a vehicle front side of a rotation center of a front wheel. A rack and pinion mechanism is disposed on a vehicle front side of the strut suspension. Since the strut suspension and the rack and pinion mechanism are disposed on the vehicle front side of the rotation center of the front wheel, a foot space can be moved forward to a position where the foot space overlaps the front wheel. A vehicle cabin space can be thereby increased.

12 Claims, 10 Drawing Sheets

VEHICLE HAVING COMPACT CONFIGURATION

BACKGROUND

1. Field

The present invention relates to a technique of reducing the size of a vehicle.

2. Description of the Related Art

Many forms of vehicles from a small vehicle to a large vehicle have been put to practical use as passenger vehicles. When size reduction is considered, a configuration of a vehicle front portion is important, and various proposals have been made for the configuration of the vehicle front portion (see, for example, FIG. 1 of Japanese Patent Publication No. 2007-069864 (Patent Document 1)).

In FIG. 1 of Patent Document 1, the left side of the drawing shows a vehicle front side and the right side of the drawing shows a vehicle rear side. In FIG. 1, reference numeral (20) (The number in parentheses indicates reference numeral described in Patent Document 1. The same shall apply hereinafter) denotes a suspension device. A front wheel axle with no reference numeral is disposed below the suspension device (20), and a steering device (30) is disposed on a vehicle rear side of the front wheel axle.

Specifically, the steering device (30) and the suspension device (20) are disposed on the vehicle rear side of the front wheel axle. The distance from the front wheel axle to a rear wheel axle is called wheelbase and is set individually for every vehicle. When the steering device (30) and the suspension device (20) are disposed on the vehicle rear side of the front wheel axle set based on the wheelbase, a vehicle cabin space becomes smaller.

However, particularly in a small vehicle whose vehicle width and vehicle length are restricted, the size of the vehicle cabin space is desired to be increased while devices for the vehicle front portion are disposed.

SUMMARY

An object of the present invention is provide a vehicle front portion structure suitable particularly for a small vehicle to increase the vehicle cabin space described above.

A first embodiment of the invention is a vehicle which includes left and right front wheels and left and right rear wheels and in which a braking device is provided for each of the front wheels and the rear wheels. The front wheels are steerably suspended from a vehicle body frame with vertical movements thereof being cushioned by strut suspensions. An upper end of each of the strut suspensions is connected to the vehicle body frame while a lower end thereof is connected to a knuckle. The upper ends and the lower ends of the strut suspensions are disposed on a vehicle front side of rotation centers of the front wheels. A foot space in which a driver is capable of placing his/her feet overlaps the front wheels in a vehicle side view. A steering device for steering the front wheels includes a rack and pinion mechanism and the rack and pinion mechanism is disposed on a vehicle front side of the strut suspensions in the vehicle side view.

A second embodiment of the invention is characterized in that the vehicle is an electric vehicle in which the rear wheels are driven by an electric motor. The braking device includes an air pump which generates a negative pressure, a surge tank which stores the generated negative pressure, and a booster mechanism which generates a boosting force by using the negative pressure. In the vehicle side view, the air pump, the surge tank, and the booster mechanism are disposed behind front surfaces of the strut suspensions but in front of the foot space.

A third embodiment of the invention is such that the steering device includes a power assist mechanism in a connection portion between a steering shaft and the rack and pinion mechanism. The power assist mechanism includes a sensor which detects a steering force applied to the steering shaft and an electric actuator which generates an assisting steering force on the basis of the sensor and adds the assisting steering force to a steering system. In the vehicle side view, the power assist mechanism is disposed behind the front surfaces of the strut suspensions but in front of the foot space.

A fourth embodiment of the invention is such that the vehicle body frame includes left and right side sills extending in a vehicle front-rear direction. A cross frame extends in the vehicle width direction and laid between front portions of the left and right side sills. A front lower frame extends toward a front of the vehicle from the cross frame. A front subframe extending upward from the front portions of the left and right side sills and then extending toward the front of the vehicle. A front frame is laid between a front end of the front subframe and a front end of the front lower frame, the upper ends of the strut suspensions are connected to the front subframe. In the vehicle side view, the booster mechanism is disposed above the front subframe and on a vehicle rear side of the strut suspensions, the rack and pinion mechanism is attached to the front frame, and the air pump and the power assist mechanism are disposed within a framework made of the front subframe, the front frame, and the front lower frame. In a vehicle plan view, the surge tank and the air pump are arranged side by side in the vehicle width direction between the left and right strut suspensions.

A fifth embodiment of the invention is such that the rack and pinion mechanism includes a case which is attached to the front frame. A rack shaft is movably housed in the case and has both ends protruding from the case. A pinion is rotatably housed in the case and moves the rack shaft, a bridge member is disposed outside the case and connects one end and another end of the rack shaft to each other, and a tie rod connection portion is provided in a center portion of the bridge member in the vehicle width direction. Left and right tie rods extend from the tie rod connection portion, and the tie rods are connected respectively to the left and right knuckles.

A sixth embodiment of the invention is such that the rack and pinion mechanism includes a turn preventing mechanism between the case and the bridge member. The turn preventing mechanism prevents the bridge member from turning about an axis of the rack shaft.

A seventh embodiment of the invention is such that the bridge member is disposed below the rack shaft, and the tie rod connection portion is disposed in a lower portion of the bridge member.

According to the first embodiment of the invention, the strut suspensions are disposed on the vehicle front side of the rotation centers of the front wheels. In addition, the rack and pinion mechanism is disposed on the vehicle front side of the strut suspensions.

In the conventional configuration, the strut suspensions and the rack and pinion mechanism are disposed on the vehicle rear side of the rotation centers of the front wheels. On the contrary, in embodiments of the present invention, the strut suspensions and the rack and pinion mechanism are disposed on the vehicle front side of the rotation centers of the front wheels. Hence, in the vehicle side view, the foot space can be moved or extended forward to a position where the foot space overlaps the front wheels. The vehicle cabin space can be thereby increased.

In addition, expansion-contraction amounts of cushions can be secured by connecting the lower ends of the strut suspensions to vehicle front side portions of the knuckles.

According to the second embodiment of the invention, the vehicle is the electric vehicle and the rear wheels are driven by the electric motor. In a rear-drive vehicle in which the electric motor is disposed near the rear wheels, there is no need to dispose a drive source in the vehicle front portion. However, since there is no drive source which generates a negative pressure, an assist mechanism for brake operation needs to be additionally provided in the vehicle front portion. In this respect, a brake operation assisting mechanism is installed by utilizing a space formed in the vehicle front portion. In such a vehicle front portion, the air pump, the surge tank, and the booster mechanism are disposed behind the front surfaces of the strut suspensions but in front of the foot space in the vehicle side view.

Specifically, since the vehicle is an electric vehicle, freedom in the arrangement of the air pump, the surge tank, and the booster mechanism is increased. Hence, the air pump, the surge tank, and the booster mechanism can be concentratedly arranged between the front surfaces of the strut suspensions and the foot space. The concentrated arrangement allows a space in the vehicle front portion to be effectively used.

According to the third embodiment of the invention, the power assist mechanism is also disposed behind the front surfaces of the strut suspensions but in front of the foot space in the vehicle side view.

In addition to the air pump, the surge tank, and the booster mechanism, the power assist mechanism can be concentratedly arranged between the front surfaces of the strut suspensions and the foot space. The concentrated arrangement allows the space in the vehicle front portion to be effectively used.

According to the fourth embodiment of the invention, in the vehicle side view, the air pump and the power assist mechanism are disposed within the framework made of the front subframe, the front frame, and the front lower frame. Moreover, in the vehicle plan view, the surge tank and the air pump are arranged between the left and right strut suspensions, side by side in the vehicle width direction.

In other words, the air pump, the power assist mechanism, and the surge tank are efficiently arranged within the framework. Since the air pump, the power assist mechanism, and the surge tank are arranged within the framework, these devices are affected less from the outside and are also protected by the framework.

According to the fifth embodiment of the invention, the left and right tie rods are connected to the center portion of the rack and pinion mechanism in the vehicle width direction.

If the tie rods are directly connected to both ends of the rack shaft, it is difficult to reduce the distance between the left and right wheels. In the present invention, since the tie rods are connected to the center portion of the rack and pinion mechanism in the vehicle width direction, the distance between the left and right wheels can be reduced.

According to the sixth embodiment of the invention, the turn preventing mechanism which prevents the bridge member from turning about the axis of the rack shaft is provided between the case and the bridge member.

Since the turn preventing mechanism is provided, there is no possibility of the bridge member swinging about the axis of the rack shaft.

According to the seventh embodiment of the invention, the bridge member is disposed below the rack shaft and the tie rod connection portion is disposed in the lower portion of the bridge member disposed as described above.

The dimension of the rack and pinion mechanism in a vehicle front-rear direction can be reduced by disposing the bridge member below the rack shaft. In addition, a space below the rack shaft can be effectively utilized.

DETAILED DESCRIPTION

Figure 1:
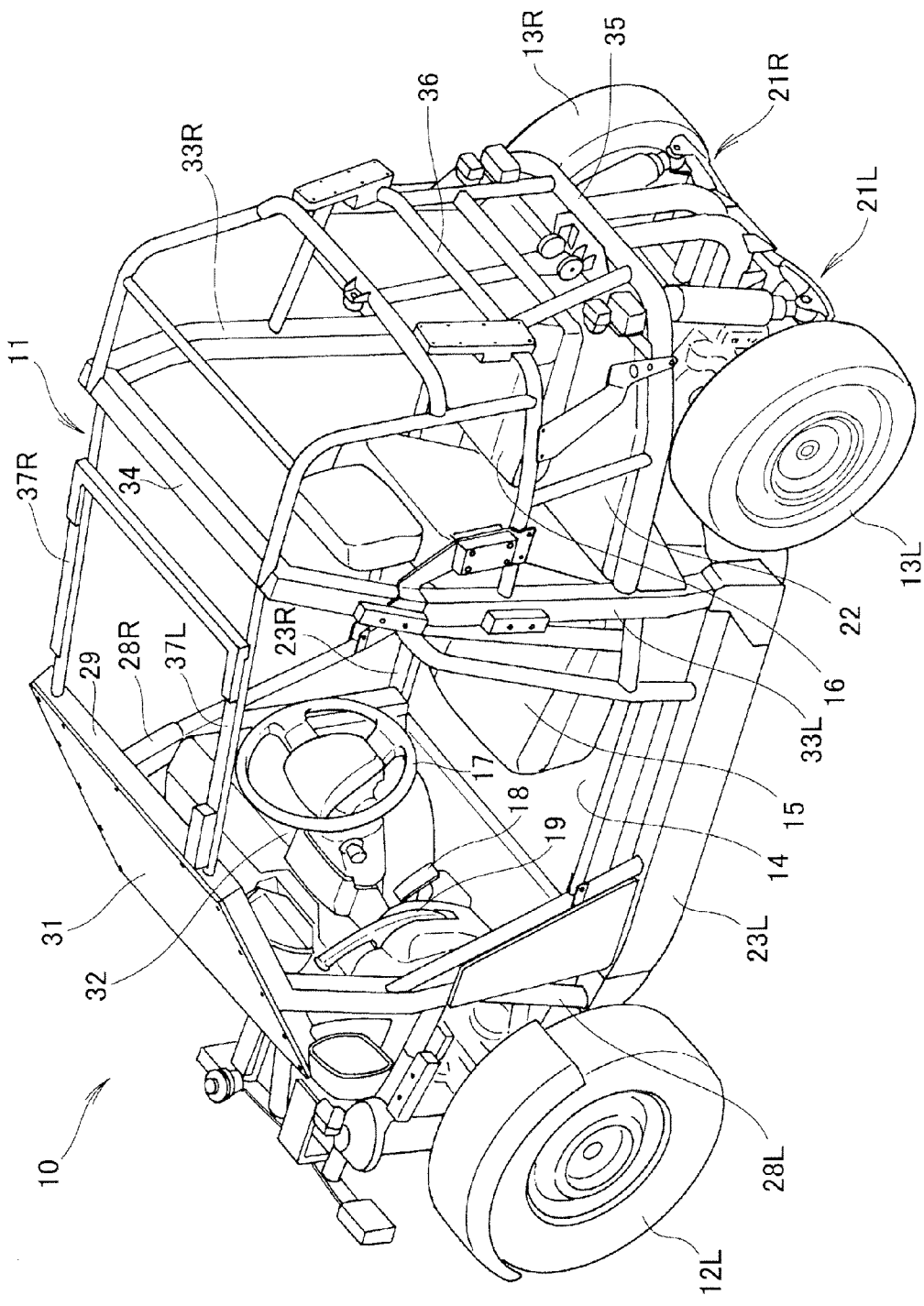
FIG. 1 is a perspective view of a vehicle according to certain embodiments of the present invention.

Embodiments of the present invention are described below based on the accompanying drawings. Note that the drawings are to be seen in a direction in which the reference numerals can be read properly. Moreover, front, rear, left, and right are based on a seating position of a driver.

As shown in FIG. 1, an electric vehicle 10 is a narrow vehicle as follows. A vehicle body frame 11 is provided with a front wheel 12L (L is a suffix indicating left. The same hereafter) and rear wheels 13L, 13R (R is a suffix indicating right. The same hereafter). A driver seat 15 is provided on a floor 14. A passenger seat 16 is provided behind the driver seat 15. A steering wheel 17, a brake pedal 18, and a parking brake lever 19 are provided in front of the driver seat 15. Although not illustrated in FIG. 1, a right front wheel exists. In other words, in this embodiment, the electric vehicle 10 is a narrow four-wheel vehicle.

The passenger seat 16 is disposed between the left and right rear wheels 13L, 13R and between suspension devices 21L, 21R. The passenger seat 16 may be replaced with a rear cargo bed. Alternatively, the passenger seat 16 may be detachably attached onto a rear cargo bed 22.

Furthermore, front upper frames 28L, 28R extend upward respectively from front end portions of the side sills 23L, 23R and a cross sub-member 29 is laid between upper ends of the front upper frames 28L, 28R. A front shield 31 is attached to the front upper frames 28L, 28R and the cross sub-member 29 from the front.

A dashboard 32 is laid between the left and right front upper frames 28L, 28R. The steering wheel 17 is disposed slightly to the left of the vehicle width center of the dashboard 32 and the parking brake lever 19 is disposed to the left of the steering wheel 17.

Rear upper frames 33L, 33R extend upward respectively from rear end portions of the side sills 23L, 23R and a cross sub-member 34 is laid between upper ends of the rear upper frames 33L, 33R. Furthermore, a square-U shaped rear subframe 35 extends from the rear upper frames 33L, 33R at a position above the rear wheels 13L, 13R to surround the passenger seat 16 from left, right, and rear. A cage-shaped cage frame 36 extends from the rear upper frames 33L, 33R and the cross sub-member 34 to surround the passenger seat 16 at a position above the rear subframe 35. Longitudinal members 37L, 37R are laid between the front cross sub-member 29 and the rear cross sub-member 34 and a vehicle cabin is thus formed.

Figure 2:
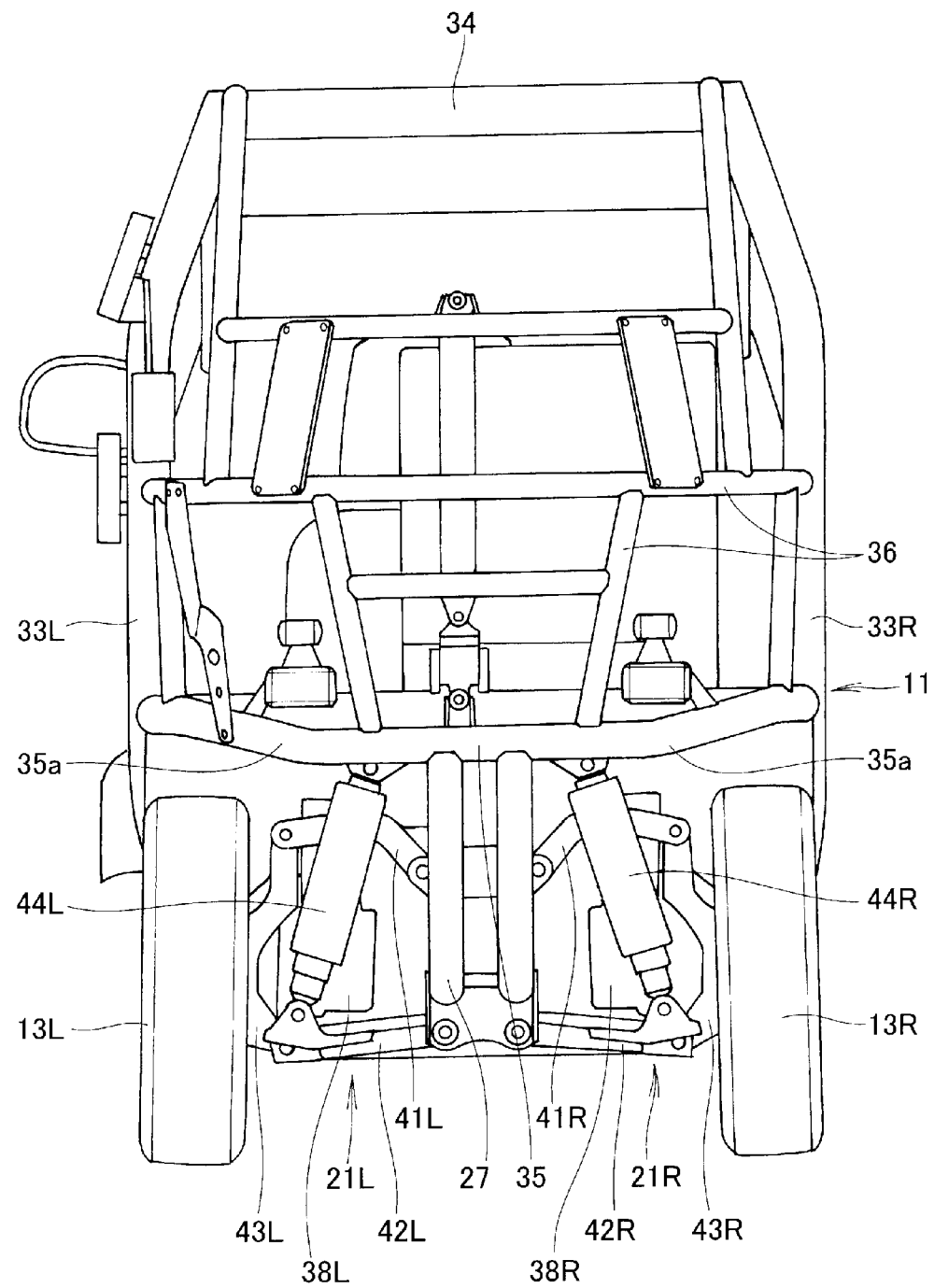
FIG. 2 is a rear view of the vehicle according to certain embodiments of the present invention.

As shown in FIG. 2, the rear wheels 13L, 13R which are left and right drive wheels are supported by the suspension devices 21L, 21R to be vertically swingable on the vehicle body frame 11. Rear wheels 13L, 13R are each inclined in such a way that an upper end thereof is closer to the vehicle width center than a lower end thereof is. The rear wheels 13L, 13R are driven respectively by electric motors 38L, 38R.

The rear subframe 35, extending in a vehicle width direction, is bent upward in portions over the rear wheels 13L, 13R. Providing bent portions 35a, 35b can secure spaces for upward swing of the rear wheels 13L, 13R.

The left suspension device 21L includes an upper arm 41L and a lower arm 42L which extend to the left from the vehicle body frame 11 in the vehicle width direction, a knuckle 43L which is connected to distal ends of the arms 41L, 42L, and a rear cushion 44L which is laid between the end of the lower arm 42L and the vehicle body frame 11 and cushions vertical movements of the rear wheels 13L, 13R.

In the right suspension device 21R, the suffixes of the reference numerals are changed from L to R and detailed description of the right suspension device 21R is omitted.

Figure 3:
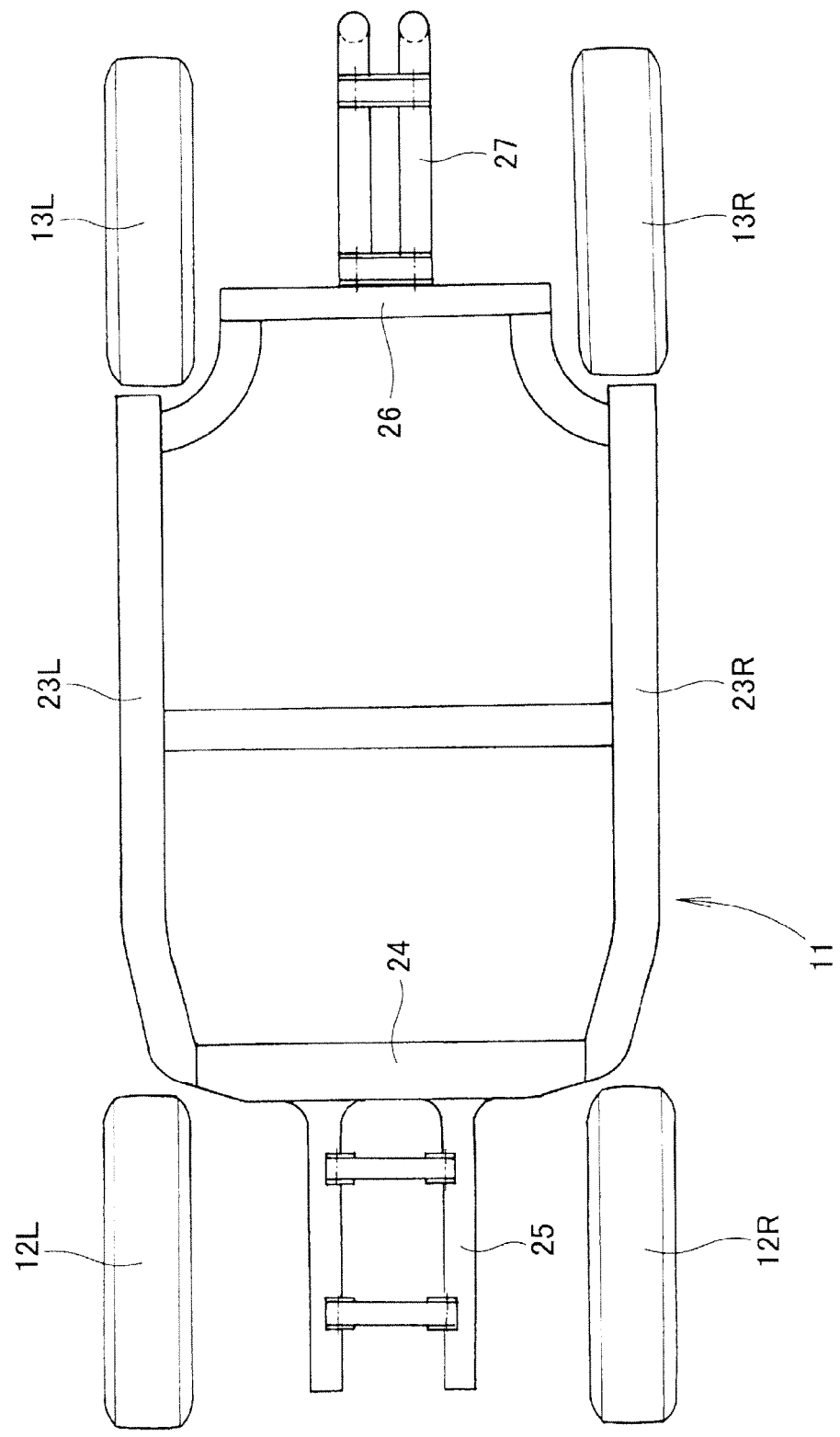
FIG. 3 is a bottom view of a vehicle body frame.

FIG. 3 is a bottom surface view of the vehicle body frame. The vehicle body frame 11 includes, as main elements, the left and right side sills 23L, 23R, a front cross frame 24 extending in the vehicle width direction and connecting front ends of the side sills 23L, 23R to each other, a front lower frame 25 extending toward the front of the vehicle from the front cross frame 24, a rear cross frame 26 extending in the vehicle width direction and connecting rear ends of the side sills 23L, 23R to each other, and a rear lower frame 27 extending toward the rear of the vehicle from the rear cross frame 26.

Figure 4:
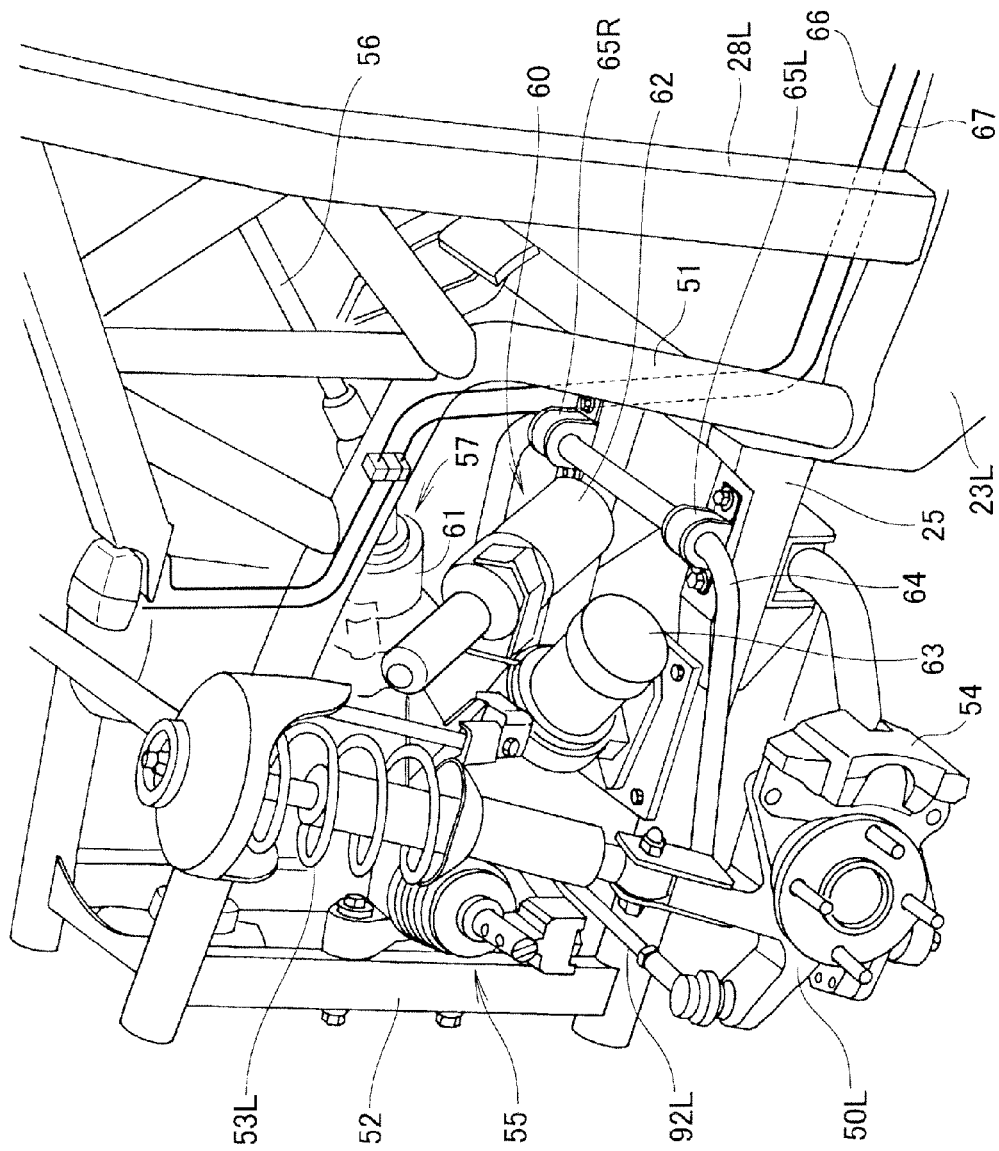
FIG. 4 is a perspective view of a vehicle front portion.

As shown in FIG. 4, a front subframe 51 extends upward from a front portion of the side sill 23L and further extends toward the front of the vehicle. A front frame 52 is vertically laid between a front end of the front subframe 51 and a front end of the front lower frame 25.

An upper end of a strut suspension 53L is supported on a middle portion of an almost horizontal portion of the front subframe 51 in a longitudinal direction thereof. The lower end of the strut suspension 53L is connected to a knuckle 50L. A brake caliper 54 for braking the front wheel is disposed near the knuckle 50L. High-pressure working medium is supplied to the brake caliper 54 from a booster mechanism to be described later and the brake caliper 54 exerts a braking effect.

A rack and pinion mechanism 55 is disposed on a vehicle front side of the strut suspension 53L. A steering shaft 56 extends from the rack and pinion mechanism 55 to a vehicle cabin. Moreover, a power assist mechanism 60 is disposed in a connection portion 57 between the steering shaft 56 and the rack and pinion mechanism 55, the power assist mechanism 60 including a sensor 61 which detects a steering force applied to the steering shaft 56 and an electric actuator 62 which generates an assisting steering force on the basis of the sensor 61 and adds the assisting steering force to a steering system.

An air pump 63, which generates a negative pressure, is disposed below the electric actuator 62.

The electric actuator 62 is disposed to be inclined three-dimensionally in such a way that, in a plan view, an upper end of the electric actuator 62 is located on a left front side and a lower end thereof is located on a right rear side while, in a vehicle side view, the upper end is located on an upper side and the lower end is located on an lower side.

The air pump 63 is disposed to be inclined three-dimensionally in such a way that, in the plan view, a front end of the air pump 63 is located on a right front side and a rear end thereof is located on a right rear side while, in the vehicle side view, the front end is located on a lower side and the rear end is located on an upper side.

Specifically, the electric actuator 62 and the air pump 63 are arranged to intersect each other in a shape of "X". This intersecting arrangement allows the electric actuator 62 and the air pump 63 to be arranged in a small space without interfering with each other.

Moreover, one end of a stabilizer 64 is connected to a lower end of the strut suspension 53L. The stabilizer 64 extends in a vehicle width direction while avoiding the electric actuator 62 and the air pump 63 by extending on a rear side thereof, and is turnably fastened to the front lower frame 25 at supports 65L, 65R.

Furthermore, braking devices such as brake calipers are also provided for the rear wheels (reference numerals 13L, 13R in FIG. 3). Operation systems 66, 67 for operating the rear wheel braking devices are routed along the front subframe 51 and the side sill 23L.

Next, description is given of a braking device 70 which actuates the brake caliper 54.

Figure 5:
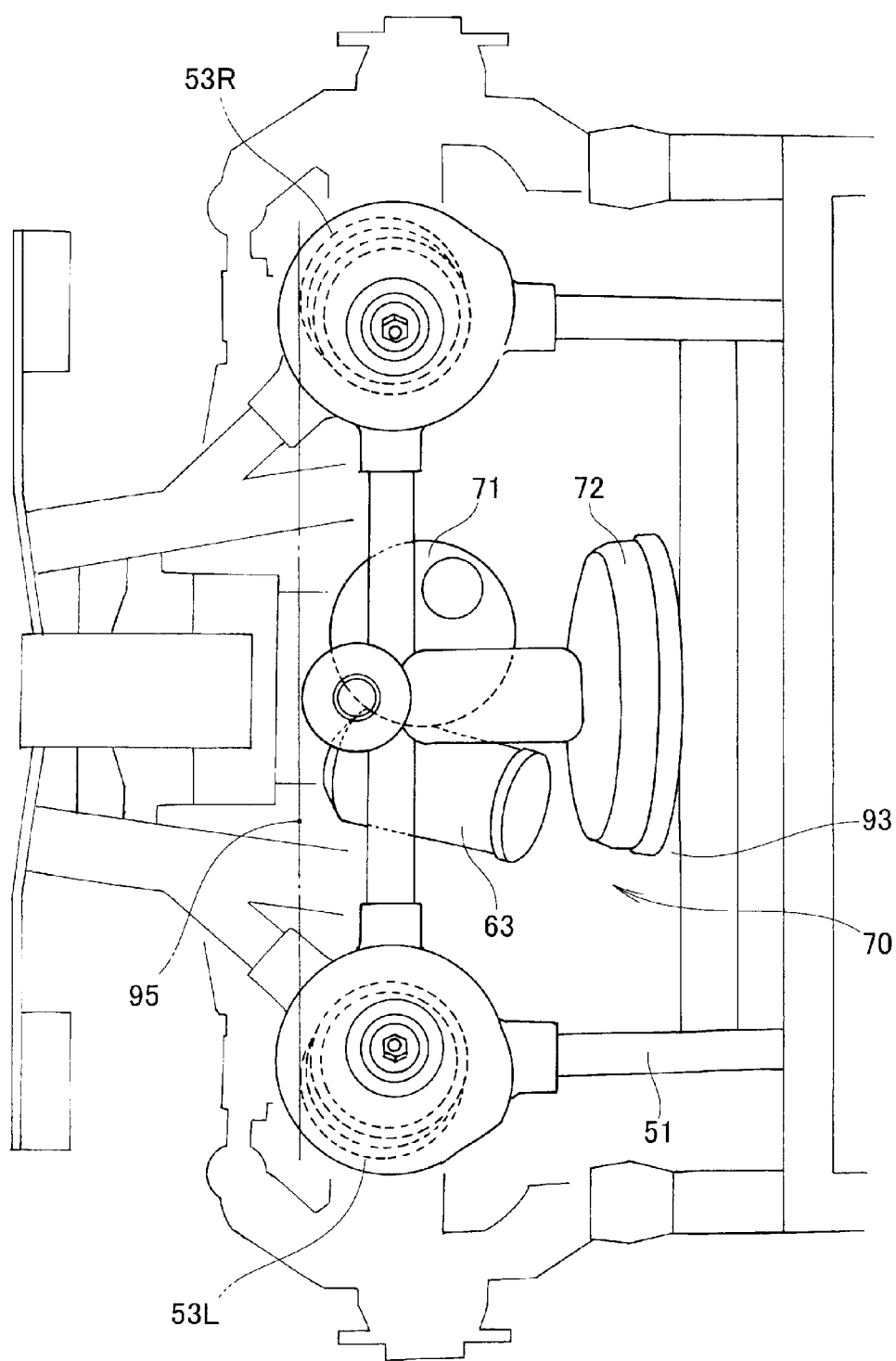
FIG. 5 is a plan view of the vehicle front portion for explaining a braking device.

As shown in FIG. 5, main components of the braking device 70 are the air pump 63 which generates a negative pressure, a surge tank 71 which stores the generated negative pressure, and a booster mechanism 72 which generates a boosting force by using the negative pressure.

The air pump 63, the surge tank 71, and the booster mechanism 72 are disposed on a vehicle rear side of a line 95 connecting front surfaces of the strut suspensions 53L, 53R.

Moreover, the air pump 63 and the surge tank 71 are arranged between the strut suspensions 53L, 53R, side by side in the vehicle width direction.

Next, description is given of details of the rack and pinion mechanism 55.

Figure 6:
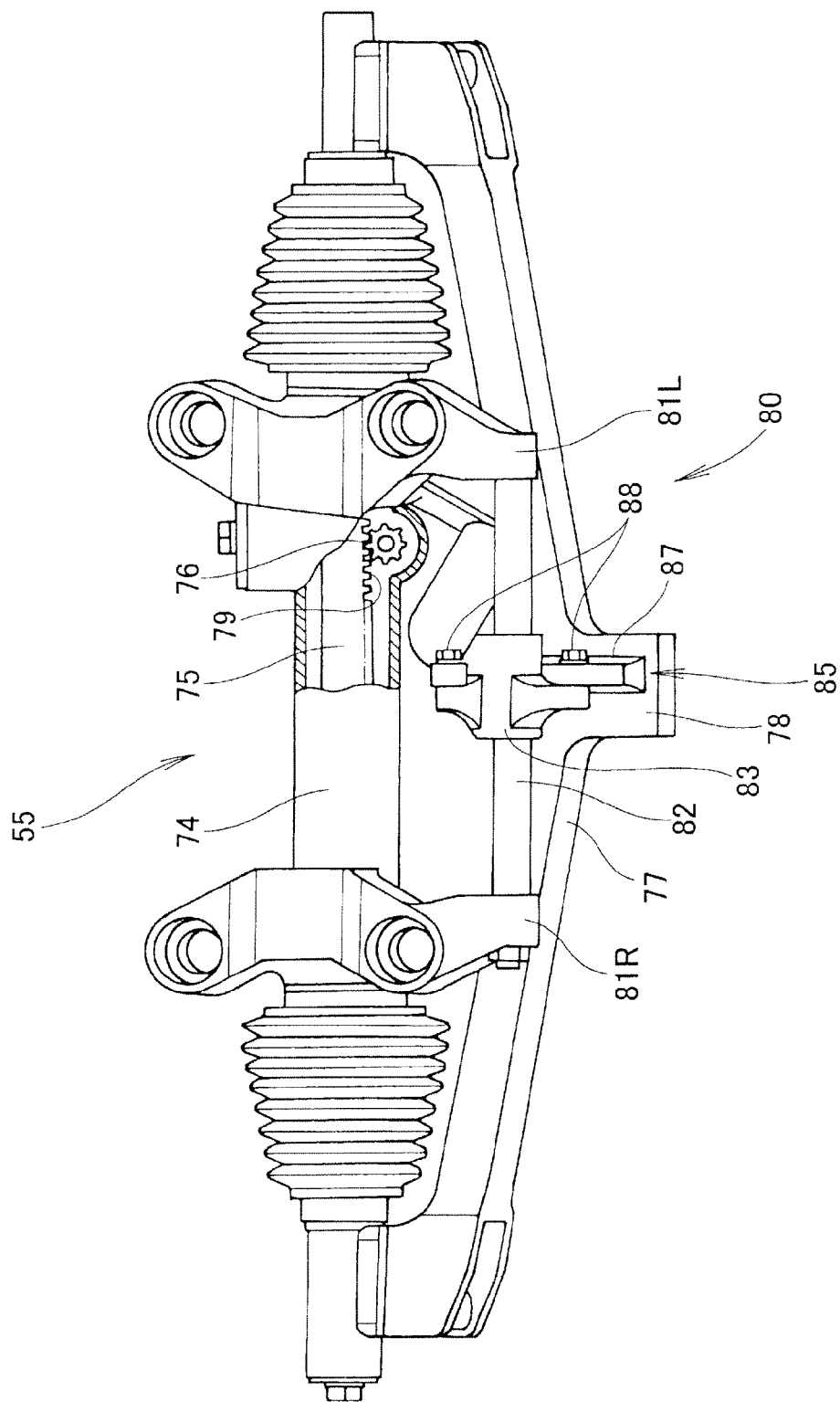
FIG. 6 is a front view of a rack and pinion device.

As shown in FIG. 6, the rack and pinion mechanism 55 includes a case 74, a rack shaft 75 movably housed in the case 74 and having both ends protruding from the case 74, a pinion 76 rotatably housed in the case 74, a bridge member 77 disposed outside the case 74 and connecting one end and the other end of the rack shaft 75 to each other, and a tie rod connection portion 78 provided in a center portion of the bridge member 77 in the vehicle width direction.

The rack shaft 75 is provided with rack teeth 79, and the pinion 76 meshes with the rack teeth 79. When the pinion 76 is rotated, the rack shaft 75 linearly moves. As a result, the bridge member 77 linearly moves.

The rack shaft 75 is attached to the case 74 in such a way that the rack shaft 75 does not idle. Moreover, it is desirable to avoid a situation where the bridge member 77 causes the rack shaft 75 to idle by the principle of levers. Accordingly, additional measures for preventing turning are recommended.

A turn preventing mechanism 80 for this purpose includes a pair of arm portions 81L, 81R which extend from the case 74, a guide rod 82 which is laid between the arm portions 81L, 81R in parallel with the rack shaft 75, a slider 83 which is fitted to the guide rod 82 to be movable in an axial direction of the rack shaft 75, and a connection mechanism 85 which connects the slider 83 to the bridge member 77.

Figure 7:
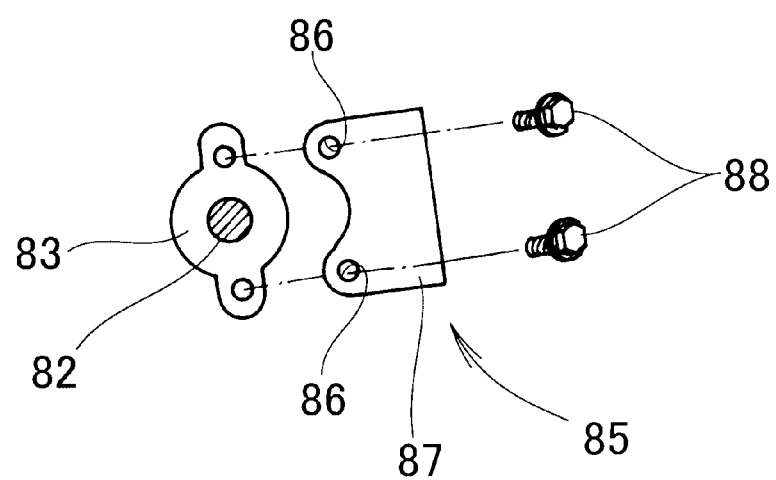
FIG. 7 is an exploded view of a main portion of the rack and pinion mechanism.

As shown in FIG. 7, the connection mechanism 85 includes a plate portion 87 provided with multiple (two in this example) bolt holes 86, 86 and multiple (two in this example) bolts 88, 88.

Figure 8:
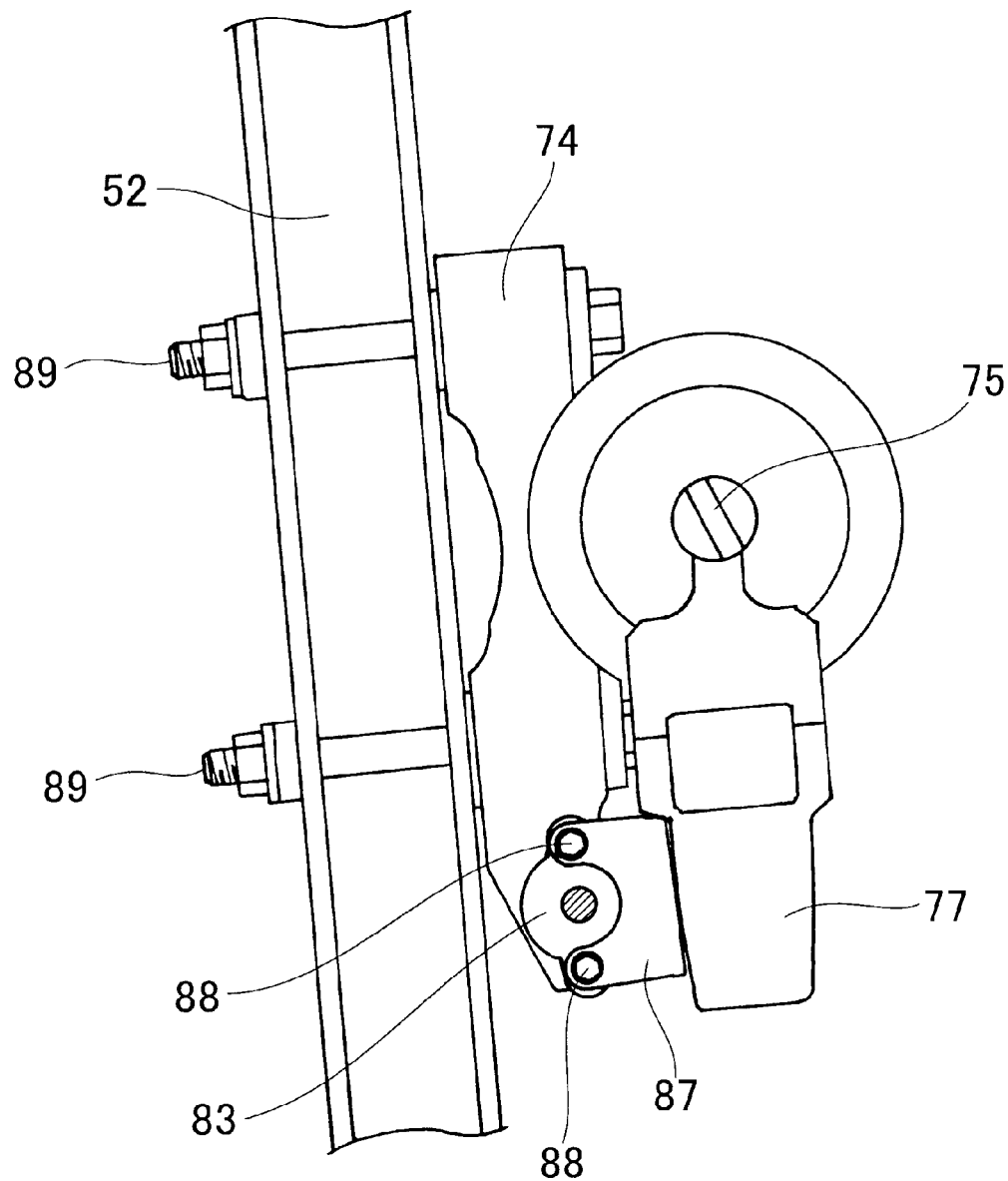
FIG. 8 is a side view of the rack and pinion mechanism.

As shown in FIG. 8, the case 74 is fixed to the front frame 52 with bolts 89, 89.

Moreover, the plate portion 87 is attached to the bridge member 77 or formed integrally with the bridge member 77. The plate portion 87 is fastened to the slider 83 with the two bolts 88, 88. When the rack shaft 75 moves to the near side in the drawing, the bridge member 77 and the slider 83 move to the near side in the drawing. At this time, turning of the bridge member 77 about the axis of the rack shaft 75 is prevented by the guide rod 82, the slider 83, and the plate portion 87.

Figure 9:
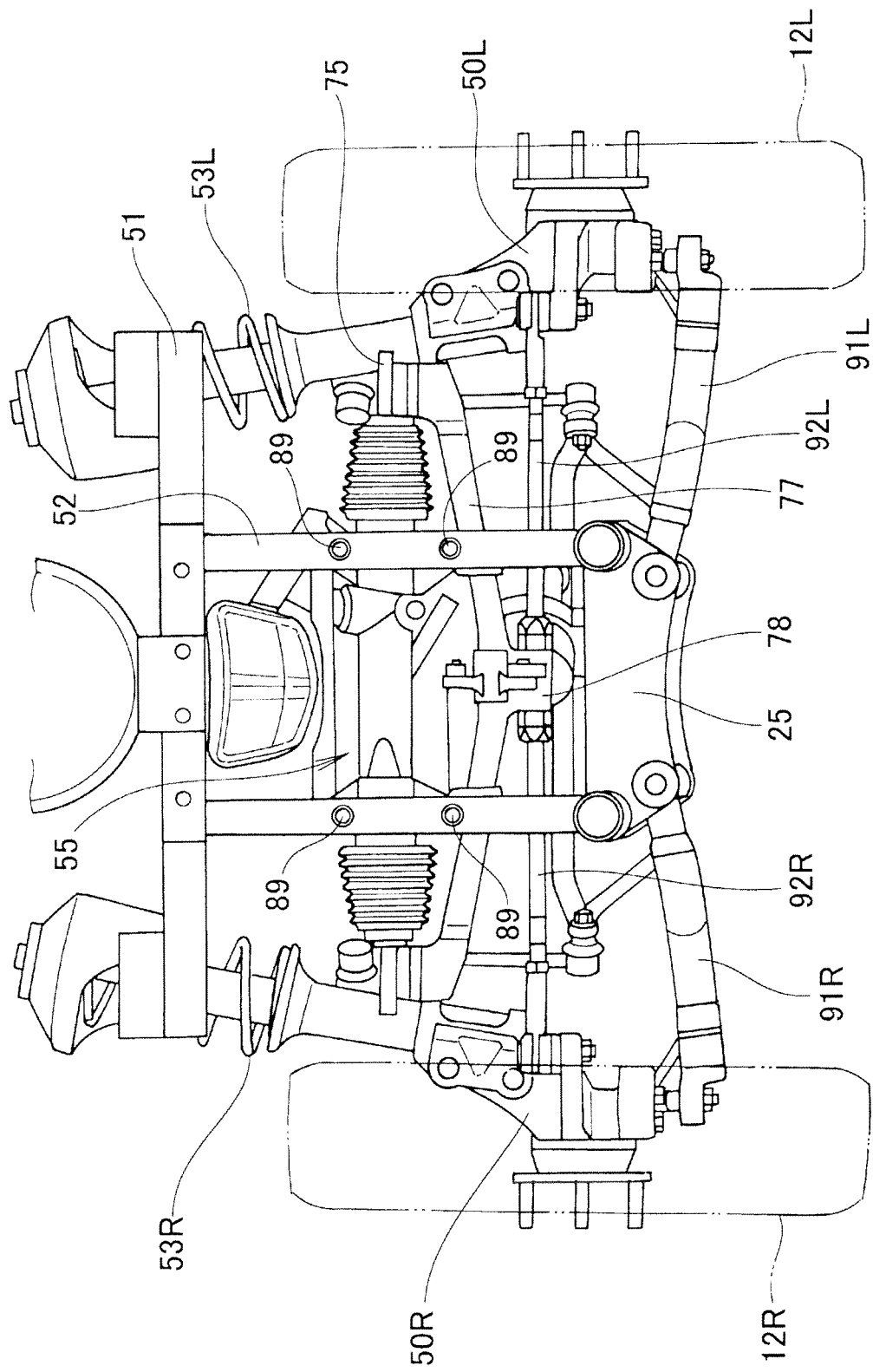
FIG. 9 is a front view of a main portion of the vehicle.

As shown in FIG. 9, the left and right front wheels 12L, 12R are supported by the knuckles 50L, 50R. The knuckles 50L, 50R are supported by the strut suspensions 53L, 53R and by lower arms 91L, 91R extending from the front lower frame 25 in a vehicle width direction to be vertically movable. Tie rods 92L, 92R extend to the left and right from the tie rod connection portion 78 in the center portion of the bridge member 77. The tie rods 92L, 92R are connected respectively to the knuckles 50L, 50R. The front wheels 12L, 12R can be thereby steered with the rack and pinion mechanism 55.

If the left and right tie rods 92L, 92R are directly connected to both ends of the rack shaft 75, it is difficult to reduce the distance between the left and right wheels. In the present invention, the tie rods 92L, 92R are connected to the tie rod connection portion 78 in the center portion in the vehicle width direction. Accordingly, the distance between the left and right front wheels can be reduced.

Next, description is given of operations of the vehicle front portion structure having the configuration described above.

Figure 10:
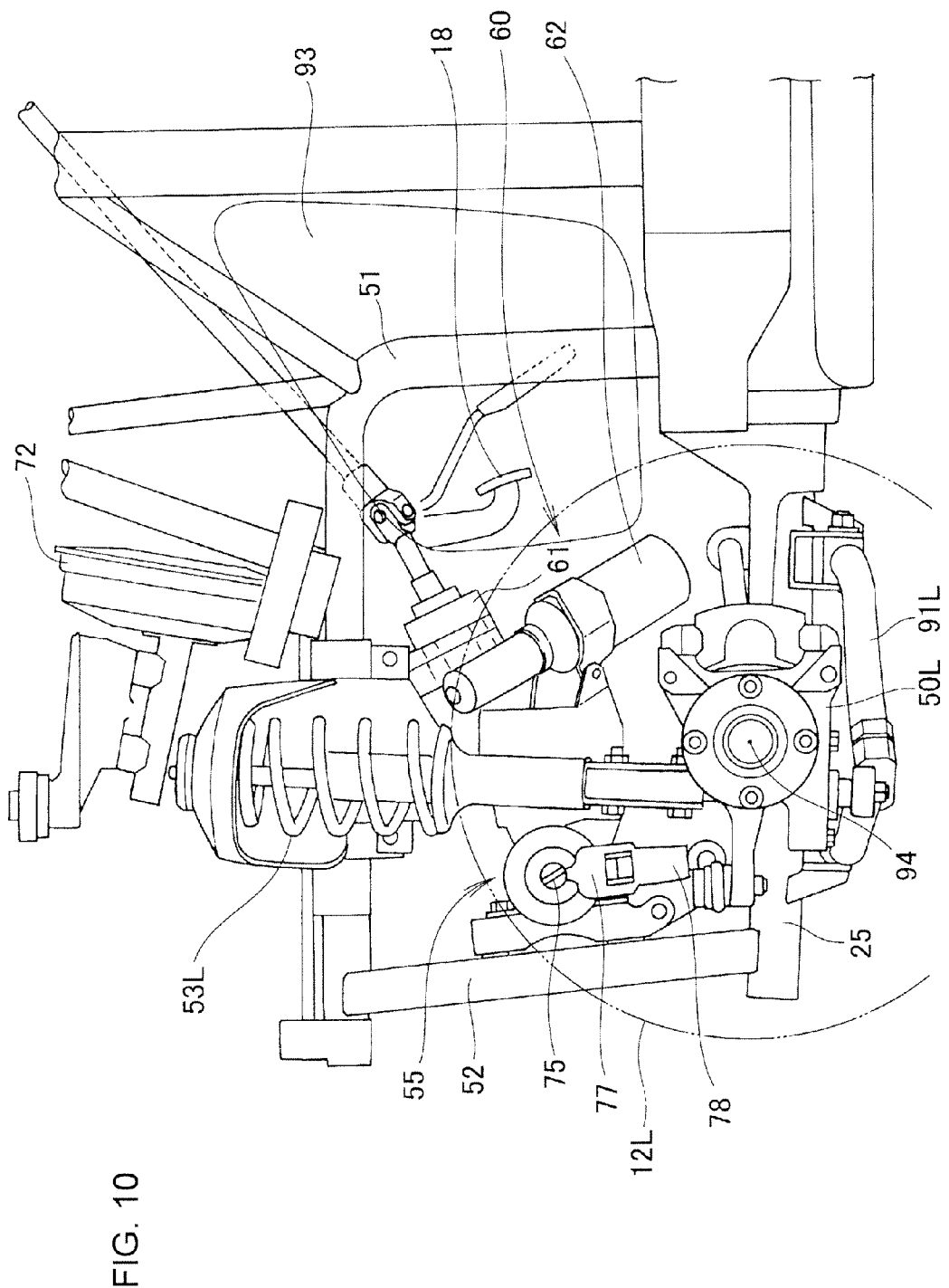
FIG. 10 is a left side view of the vehicle front portion.

As shown in FIG. 10, the strut suspension 53L is disposed on a vehicle front side of a rotation center 94 of the front wheel 12L. In addition, the rack and pinion mechanism 55 is disposed on the vehicle front side of the strut suspension 53L.

In the drawing, a portion around the brake pedal 18 is a foot space 93. Since the strut suspension 53L and the rack and pinion mechanism 55 are disposed on the vehicle front side of the rotation center 94 of the front wheel 12L, the foot space 93 can be extended or moved forward to a position where the foot space 93 overlaps the front wheel 12L shown by an imaginary line. A vehicle cabin space can be thereby increased.

Furthermore, an expansion-contraction amount of a cushion can be secured by connecting the lower end of the strut suspension 53L to a vehicle front side portion of the knuckle 50L.

As shown in FIG. 5, the air pump 63, the surge tank 71, and the booster mechanism 72 are disposed behind the line 95 connecting the front surfaces of the strut suspensions 53L, 53R but in front of the foot space 93.

Also in the side view shown in FIG. 10, the air pump 63, the surge tank 71, and the booster mechanism 72, are disposed behind the front surface of the strut suspension 53L but in front of the foot space 93. Note that the booster mechanism 72 is disposed above the front subframe 51.

Since the vehicle is an electric vehicle, freedom in the arrangement of the air pump 63, the surge tank 71, and the booster mechanism 72 is increased. Hence, the air pump 63, the surge tank 71, and the booster mechanism 72 can be concentratedly arranged between the front surface of the strut suspension 53L and the foot space 93. The concentrated arrangement allows a space in the vehicle front portion to be effectively used.

In addition, the power assist mechanism 60 is also disposed behind the front surface of the strut suspension 53L but in front of the foot space 93 in the vehicle side view.

In addition to the air pump 63, the surge tank 71, and the booster mechanism 72, the power assist mechanism 60 can be concentratedly arranged between the front surface of the strut suspension 53L and the foot space 93. The concentrated arrangement allows the space in the vehicle front portion to be effectively used.

Moreover, the air pump 63 and the power assist mechanism 60 are disposed within a framework made of the front subframe 51, the front frame 52, and the front lower frame 25.

In addition, as shown in FIG. 5, the surge tank 71 and the air pump 63 are arranged side by side in the vehicle width direction between the left and right strut suspensions 53L, 53R in the vehicle plan view.

In other words, the air pump 63, the power assist mechanism 60, and the surge tank 71 are efficiently arranged within the framework. Since the air pump 63, the power assist mechanism 60, and the surge tank 71 are arranged within the framework, these devices are affected less from the outside and are also protected by the framework.

Moreover, as shown in FIG. 10, the bridge member 77 is disposed below the rack shaft 75 and the tie rod connection portion 78 is disposed in a lower portion of the bridge member 77 disposed as described above.

The dimension of the rack and pinion mechanism 55 in a vehicle front-rear direction can be reduced by disposing the bridge member 77 below the rack shaft 75. In addition, a space below the rack shaft 75 can be effectively utilized.

The present invention is suitable for a narrow ultra-compact vehicle in which the driver seat and the passenger seat are disposed one in front of the other. However, there is no problem in applying the present invention to small vehicles, mid-size vehicles, and large vehicles in which the driver seat and the passenger seat are arranged side by side.

The present invention is preferably applied to a narrow four-wheel vehicle in which a driver seat and a passenger seat are arranged one behind the other.

EXPLANATION OF THE REFERENCE NUMERALS

10 ELECTRIC VEHICLE
11 VEHICLE BODY FRAME
12L, 12R FRONT WHEEL
13L, 13R REAR WHEEL
23L, 23R SIDE SILL
24 CROSS FRAME (FRONT CROSS FRAME)
25 FRONT LOWER FRAME
38L, 38R ELECTRIC MOTOR
50L, 50R KNUCKLE (FRONT WHEEL KNUCKLE)
51 FRONT SUBFRAME
52 FRONT FRAME
53L, 53R STRUT SUSPENSION
55 RACK AND PINION MECHANISM
56 STEERING SHAFT
57 CONNECTION PORTION
60 POWER ASSIST MECHANISM
61 SENSOR
62 ELECTRIC ACTUATOR
63 AIR PUMP
70 BRAKING DEVICE
71 SURGE TANK
72 BOOSTER MECHANISM
74 CASE
75 RACK SHAFT

76 PINION
77 BRIDGE MEMBER
78 TIE ROD CONNECTION PORTION
80 TURN PREVENTING MECHANISM
92L, 92R TIE ROD
93 FOOT SPACE
94 ROTATION CENTER (ROTATION CENTER OF FRONT WHEEL)
95 LINE CONNECTING FRONT SURFACES OF LEFT AND RIGHT STRUT SUSPENSIONS

The invention claimed is:

1. A vehicle, comprising:
left and right front wheels, each of said left and right front wheels including a braking device therefor, each of said front wheels being steerably suspended from a vehicle body frame by a strut suspension;
left and right rear wheels, each of said left and right rear wheels including a braking device therefor;
a steering device configured to steer the front wheels, said steering device including a rack and pinion mechanism, said rack and pinion mechanism being disposed on a vehicle front side of the strut suspensions in a vehicle side view,
wherein an upper end of each of the strut suspensions is connected to the vehicle body frame while a lower end thereof is connected to a knuckle,
wherein the upper ends and the lower ends of the strut suspensions are disposed on a vehicle front side of rotation centers of the left and right front wheels,
wherein a foot space in which a driver is capable of placing his/her feet overlaps the front wheels in the vehicle side view,
wherein
the vehicle comprises an electric vehicle in which the rear wheels are driven by an electric motor,
wherein the braking device includes an air pump which generates a negative pressure, a surge tank which stores the generated negative pressure, and a booster mechanism which generates a boosting force by using the negative pressure, and
wherein, in the vehicle side view, the air pump, the surge tank, and the booster mechanism are disposed behind front surfaces of the strut suspensions but in front of the foot space.

2. The vehicle according to claim 1, wherein
the steering device includes a power assist mechanism in a connection portion between a steering shaft and the rack and pinion mechanism, the power assist mechanism including a sensor configured to detect a steering force applied to the steering shaft and an electric actuator configured to generate an assisting steering force based on the sensor and to add the assisting steering force to a steering system, and
wherein, in the vehicle side view, the power assist mechanism is disposed behind the front surfaces of the strut suspensions and in front of the foot space.

3. The vehicle according to claim 2, wherein
the vehicle body frame includes left and right side sills extending in a vehicle front-rear direction, a cross frame extending in the vehicle width direction and laid between front portions of the left and right side sills, a front lower frame extending toward a front of the vehicle from the cross frame, a front subframe extending upward from the front portions of the left and right side sills and then extending toward the front of the vehicle, and a front frame laid between a front end of the front subframe and a front end of the front lower frame,
wherein the upper ends of the strut suspensions are connected to the front subframe,
wherein, in the vehicle side view,
the booster mechanism is disposed above the front subframe and on a vehicle rear side of the strut suspensions,
the rack and pinion mechanism is attached to the front frame, and
the air pump and the power assist mechanism are disposed within a framework made of the front subframe, the front frame, and the front lower frame, and
wherein, in a vehicle plan view, the surge tank and the air pump are disposed side by side in the vehicle width direction between the left and right strut suspensions.

4. The vehicle according to claim 2, wherein
the rack and pinion mechanism includes a case which is attached to the front frame, a rack shaft which is movably housed in the case and has both ends protruding from the case, a pinion which is rotatably housed in the case and moves the rack shaft, a bridge member which is disposed outside the case and connects one end and another end of the rack shaft to each other, and a tie rod connection portion which is provided in a center portion of the bridge member in the vehicle width direction, and
wherein left and right tie rods extend from the tie rod connection portion, the tie rods being connected respectively to the left and right knuckles.

5. The vehicle according to claim 4, wherein the rack and pinion mechanism includes a turn preventing mechanism between the case and the bridge member, the turn preventing mechanism preventing the bridge member from turning about an axis of the rack shaft.

6. The vehicle according to claim 4, wherein the bridge member is disposed below the rack shaft and the tie rod connection portion is disposed in a lower portion of the bridge member.

7. A vehicle, comprising:
left and right front wheels;
first braking means for providing a braking force to each of said left and right front wheels;
strut suspension means for steerably supporting each of said left and right front wheels;
left and right rear wheels;
second braking means for providing braking force to each of said left and right rear wheels;
steering means for steering the front wheels, said steering means including rack and pinion means disposed on a vehicle front side of the strut suspension means in a vehicle side view, wherein an upper end of the strut suspension means is connected to the vehicle body frame, while a lower end of the suspension means is connected to a knuckle, the upper ends and the lower ends of the suspension means are disposed on a vehicle front side of rotation centers of the left and right front wheels, and a foot space in which a driver is capable of placing his/her feet overlaps the front wheels in the vehicle side view;
electric motor means for driving the rear wheels of the vehicle such that the vehicle comprises an electric vehicle,
wherein each of the first and second braking means comprises at least one air pump means for generating a negative pressure, surge tank means for storing the generated negative pressure, and a booster means for generating a boosting force by using the negative pressure, and wherein, in the vehicle side view, the air pump means, the surge tank means, and the booster means are disposed behind front surface of the strut suspension means but in front of the foot space.

8. The vehicle according to claim 7, wherein the steering means comprises power assist means in a connection portion between a steering shaft means and the rack and pinion means, the power assist means including sensor means for detecting a steering force applied to the steering shaft means and actuator means for generating an assisting steering force based on the sensor means and for adding the assisting steering force to a steering system, and wherein, in the vehicle side view, the power assist means is disposed behind the front surfaces of the strut suspension means and in front of the foot space.

9. The vehicle according to claim 8, wherein the vehicle body frame includes left and right side sill means extending in a vehicle front-rear direction, a cross frame extending in the vehicle width direction and laid between front portions of the left and right side sill means, a front lower frame extending toward a front of the vehicle from the cross frame, a front subframe extending upward from the front portions of the left and right side sill means and extending toward the front of the vehicle, and a front frame laid between a front end of the front subframe and a front end of the front lower frame, wherein the upper end of the strut suspension means is connected to the front subframe, wherein, in the vehicle side view, the booster means is disposed above the front subframe and on a vehicle rear side of the strut suspension means, the rack and pinion means is attached to the front frame, the air pump means and the power assist means are disposed within a framework made of the front subframe, the front frame, and the front lower frame, and wherein, in a vehicle plan view, the surge tank means and the air pump means are disposed side-by-side in the vehicle width direction between left and right portions of the strut suspension means.

10. The vehicle according to claim 8, wherein the rack and pinion means comprises case means for housing components therein, said case means being attached to the front frame, rack shaft means being movably supported in the case means, said rack shaft means having both ends protruding from the case means, pinion means for moving the shaft means and being rotatably housed in the case means, bridge means disposed outside the case means for connecting one end and another end of the rack shaft means to each other, and tie rod connection means disposed in a center portion of the bridge means in the vehicle width direction, wherein left and right tie rod means extend from the tie rod connection means, the tie rods being connected to left and right knuckles.

11. The vehicle according to claim 10, wherein the rack and pinion means includes turn preventing means between the case means and the bridge means, the turn preventing means for preventing the bridge means from turning about an axis of the rack shaft means.

12. The vehicle according to claim 10, wherein the bridge means is disposed below the rack shaft means and the tie rod connection means is disposed in a lower portion of the bridge means.

* * * * *